United States Patent [19]

Inoue et al.

[11] Patent Number: 5,471,041
[45] Date of Patent: Nov. 28, 1995

[54] BAR-CODE READER DEVICE

[75] Inventors: Katsushi Inoue, Kyoto; Seiichiro Tamai, Osaka; Keiichi Kobayashi, Higashiosaka; Marie Dosho, Katano, all of Japan

[73] Assignee: Matsushita Electric Industrial Co., Ltd., Osaka, Japan

[21] Appl. No.: 77,096

[22] Filed: Jun. 16, 1993

[30] Foreign Application Priority Data

Jun. 22, 1992 [JP] Japan ............ 4-161543

[51] Int. Cl.⁶ ............................................. G06K 7/10
[52] U.S. Cl. ............................................. 235/462
[58] Field of Search ............................ 235/462, 472

[56] References Cited

U.S. PATENT DOCUMENTS

| | | | |
|---|---|---|---|
| 4,794,239 | 12/1988 | Allais | 235/462 |
| 4,900,907 | 2/1990 | Matusima et al. | 235/472 |
| 5,124,537 | 6/1992 | Chandler et al. | 235/462 |
| 5,235,167 | 8/1993 | Dvorkis et al. | 235/462 |
| 5,241,164 | 8/1993 | Pavlidis et al. | 235/462 |
| 5,243,655 | 9/1993 | Wang | 235/462 |
| 5,245,167 | 9/1993 | Takenaka | 235/462 |
| 5,319,181 | 6/1994 | Shellhammer et al. | 235/462 |

FOREIGN PATENT DOCUMENTS

0273554A2  7/1988  European Pat. Off. .
0384955A2  9/1990  European Pat. Off. .

Primary Examiner—Donald Hajec
Assistant Examiner—Jeffrey R. Filipek
Attorney, Agent, or Firm—Stevens, Davis, Miller & Mosher

[57] ABSTRACT

A bar-code reader which reads a bar code label through the scanning operation comprises a waveform processing circuit, a memory unit for storing data in a serial manner in synchronism with the scanning across the bar code symbol, an extraction unit for extracting a bar code symbol from the output of the memory unit, and a decoding unit for decoding the bar code symbol based on the output of the extraction unit.

2 Claims, 5 Drawing Sheets

F I G. 3A
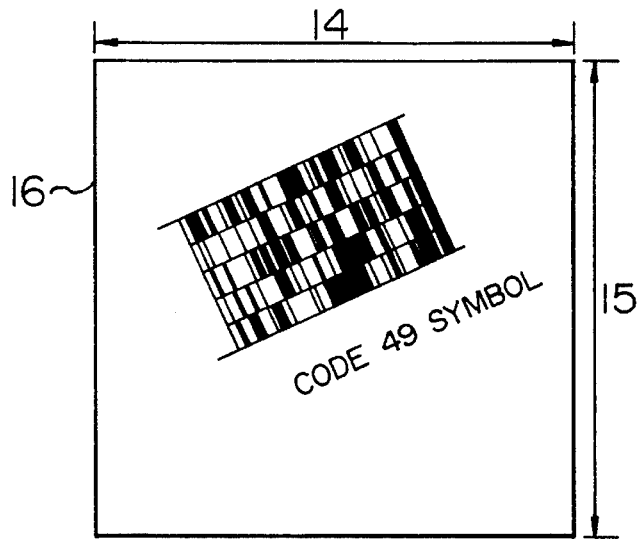
F I G. 3B
F I G. 3C
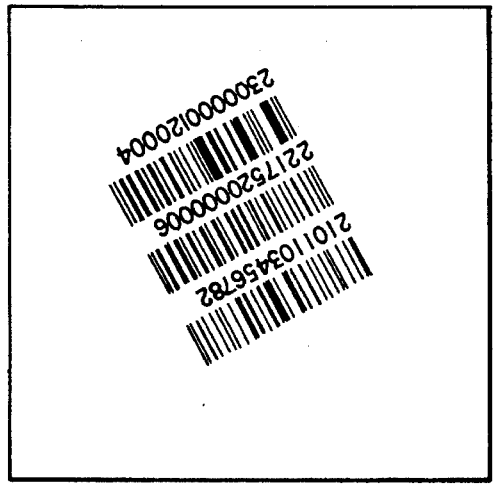

BAR-CODE READER DEVICE

CROSS-REFERENCE TO RELATED APPLICATION

This application is a related application to a U.S. application which was filed on Jun. 6, 1993, as Ser. No. 08/076,960, and entitled BAR-CODE READER APPARATUS, the priority of which is based on Japanese patent application 4-161542 filed on Jun. 22, 1992.

BACKGROUND OF THE INVENTION

This invention relates to a bar-code reader use in the EPOS system and the like.

Conventional prevailing bar-code reader based on the linear image sensor operate only when a complete bar code symbol including start and stop patterns enters at once in the view field of the linear image sensor.

In order to increase information carried by a bar code symbol and reduce the size of symbol, new bar code systems Code49 and Code16K have been developed recently. These bar codes, generally called "two-dimensional bar codes," are intended to increase information and reduce the symbol size by disposing rows of stripes in multiple stages instead of extending the alignment of stripes too long.

However, conventional bar-code readers based on the linear image sensor are not capable of reading these two-dimensional bar code symbols. Moreover, conventional bar-code readers are not capable of reading even usual bar code symbols if they are held in an inclined attitude against the bar code label, in which case a complete bar code symbol including start and stop patterns does not enter at once in the view field of the image sensor.

SUMMARY OF THE INVENTION

This invention is intended to overcome the foregoing prior art deficiencies, and its prime object is to provide a bar-code reader capable of reading two-dimensional bar code symbols.

Another object of this invention is to provide a bar-code reader capable of reading one-dimensional bar code symbols in addition to two-dimensional bar code symbols.

Still another object of this invention is to provide a bar-code reader capable of reading multi-stage bar code symbols in addition to one-dimensional and two-dimensional bar code symbols.

A further object of this invention is to provide a bar-code reader capable of reading bar code symbols even if it is held in an inclined attitude against the bar code label, in which case a complete bar code symbol including start and stop patterns does not enter at once in the view field of the image sensor.

In order to achieve the above objectives, the bar-code reader based on this invention comprises a light emission means for projecting a light beam onto a bar code label, a light reception means for focusing the reflected light from the label on an image sensor, a signal processing means for processing the output signal of the image sensor, a memory means for storing data provided by the signal processing means in a serial manner in synchronism with the scanning across the bar code label, an extraction means for extracting a bar code symbol from data in the memory means, and a decoding means for decoding the bar code symbol based on the output of the extraction means. The bar-code reader is operative to read One-dimensional bar code symbols, two-dimensional bar code symbols and multi-stage bar code symbols.

Based on the foregoing arrangement of the bar-code reader, the image sensor output which is derived from the reflected light from the bar code label is memorized during the scanning operation and the bar code symbol is decoded based on the bar code data read out of the memory, and consequently even if the bar-code reader is held in an inclined attitude against the bar code label, in which case a complete bar code symbol does not enter at once in the view field of the image sensor, bar code symbols of any type can be read.

BRIEF DESCRIPTION OF THE DRAWINGS

FIG. 3A is a diagram showing, as a pattern figure, the memorized image data including a two-dimensional bar code symbol;

FIG. 3B is a diagram showing, as a pattern figure, the memorized image data including a one-dimensional bar code symbol;

FIG. 3C is a diagram showing, as a pattern figure, the memorized image data including a multi-stage bar code symbol;

DESCRIPTION OF THE PREFERRED EMBODIMENT

An embodiment of this invention will be described with reference to the drawings.

Figure 1:
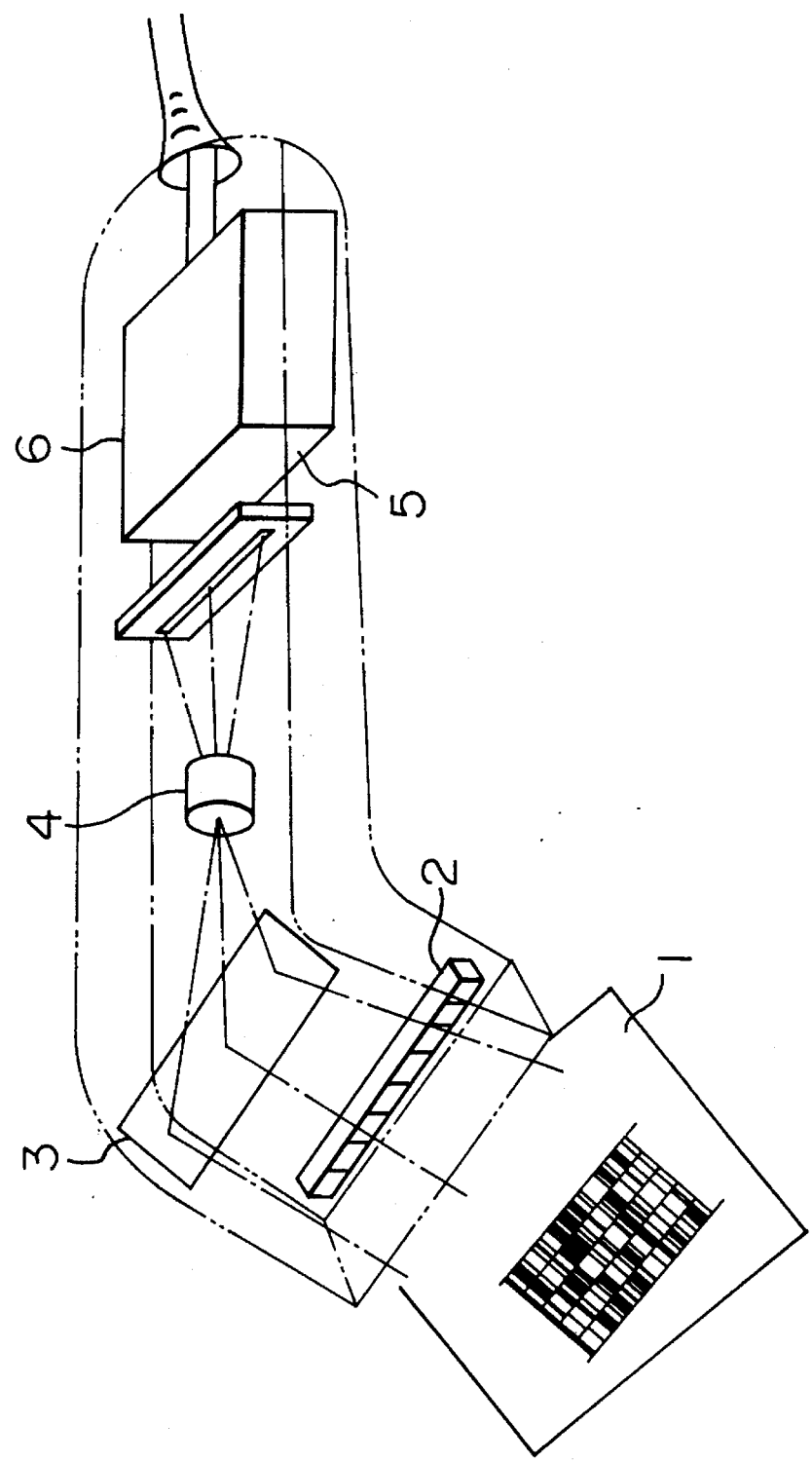
FIG. 1 is a perspective diagram showing the internal structure of the bar-code reader based on an embodiment of this invention.

FIG. 1 shows the structure of the bar-code reader based on this invention. In the figure, the bar-code reader includes a light emitter 2 which projects a light beam onto a bar code symbol printed on a label 1. The reflected light from the label 1 is conducted by way of a mirror 3 and lens 4 to a linear image sensor 5, which is connected electrically to a circuit section 6.

The light emitter 2 consists of an alignment of multiple LEDs having a 660 nm wavelength. The linear image sensor 5 is formed of a CCD (charge coupled device) linear image sensor of 3648 pixels, and it functions to convert a bar code image focused by the lens 4 into an electrical signal. The circuit section 6 includes a waveform processing circuit, a semiconductor memory as a memory means, and a microprocessor which performs the functions of extraction means and decoding means.

The image sensor may otherwise be a device based on the CID (charge injection device) or other opto-electric transducing device. Sensor elements may be of the point arrangement adopted for a photo-sensor used in a pen-type bar-code reader, or may be of the linear arrangement adopted for a linear image sensor, or may be of the planar arrangement adopted for an area image sensor.

Bar code symbols which can be read by this bar-code reader include one-dimensional bar code symbols, two-dimensional bar code symbols and multi-stage bar code symbols.

Figure 2:
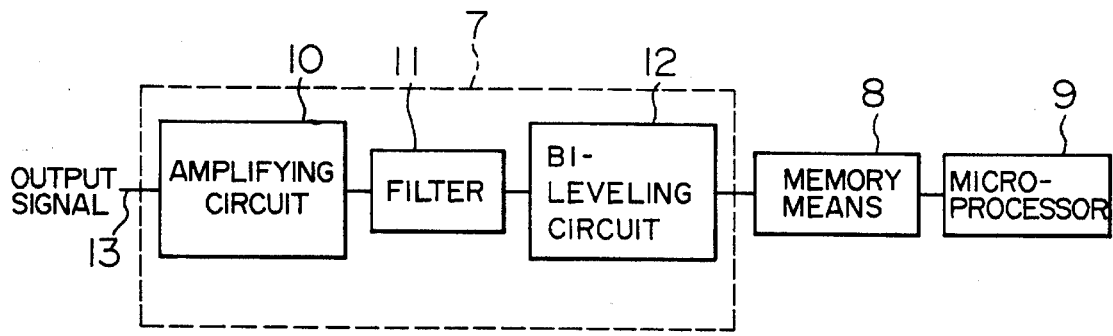
FIG. 2 is a block diagram of the circuit section of the bar-code reader shown in FIG. 1.

FIG. 2 shows in block diagram the arrangement of the circuit section 6. Indicated by 7 is a waveform processing circuit which amplifies the signal from the linear image sensor 5 and converts the analog signal into a two-level digital signal. The circuit 7 consists of an amplifying circuit 10, a filter circuit 11 and a bi-leveling circuit 12 all formed of operational amplifiers or the like.

Indicated by 8 is a memory means for storing the bar code data derived from the linear image sensor 5 in a serial manner, and it is formed of a semiconductor memory. 9 is a microprocessor which functions to extract a bar code symbol from data in the memory 8 and decode the symbol. Other electrical components such as LEDs and a buzzer which notifies the completion of bar code reading and their associated control circuits are not shown in FIG. 2.

FIG. 3A shows image data including a two-dimensional bar code symbol stored in the memory 8 through the waveform processing circuit 7. A dimension 14 corresponds to the width of reading of the image sensor (number of pixels, i.e., 3648 bits in this embodiment), and a dimension 15 corresponds to the length of reading (3648 bits in this embodiment). The capacity of the memory 8 is determined from the required resolution and the cost.

FIG. 3B shows image data including a one-dimensional bar code symbol stored in the memory 8 through the waveform processing circuit 7, and FIG. 3C shows image data including a multi-stage bar code symbol stored in the memory 8 through the waveform processing circuit 7.

Figure 4:
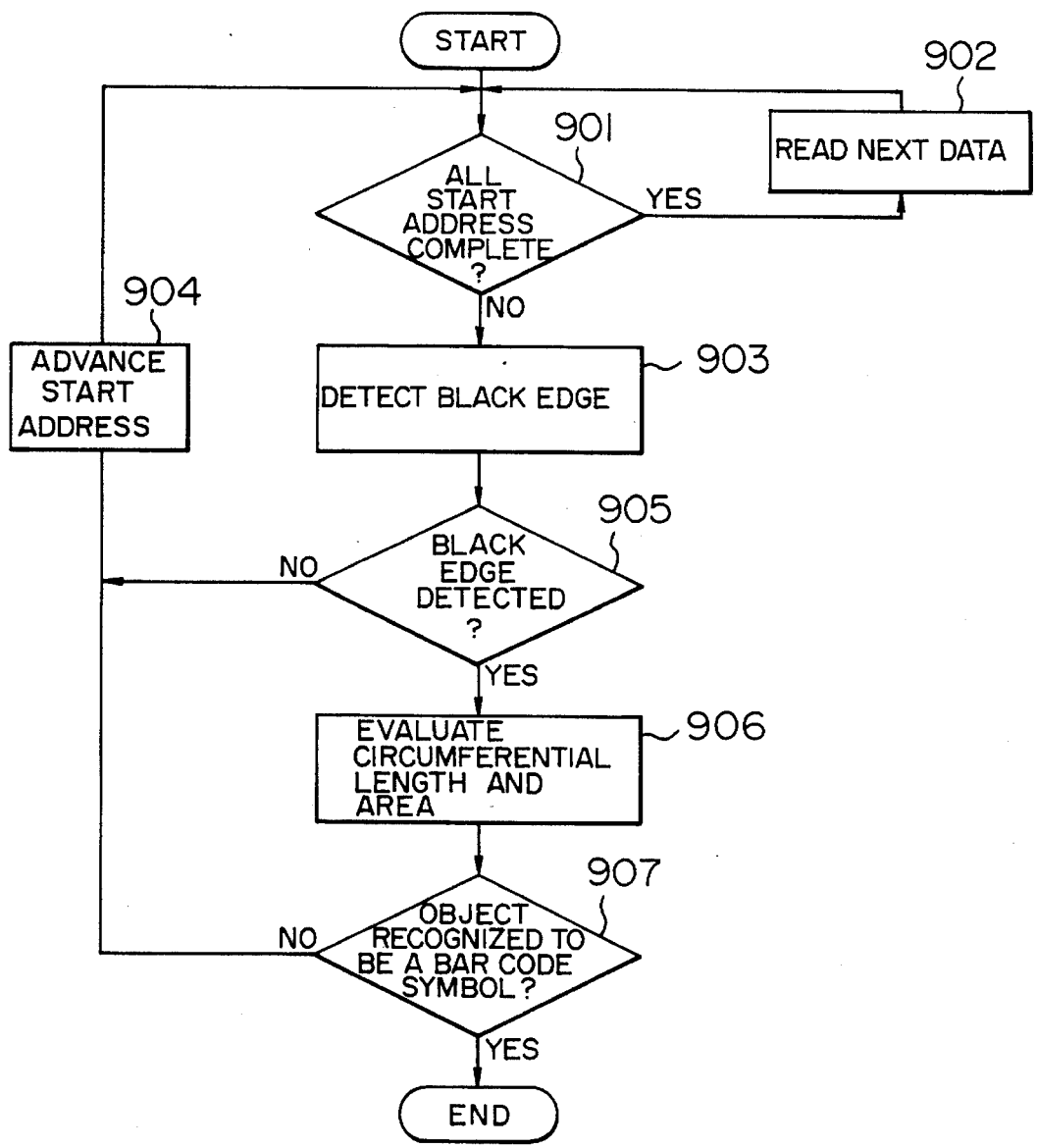
FIG. 4 is a flowchart showing the operation of the extraction means.

FIG. 4 shows in flowchart the operation of the extraction means for extracting a two-dimensional bar code symbol based on the Code49 system from the image data shown in FIG. 3A.

The memory has a start address 16 located at the center of the left bound. The memory address is moved toward the right to detect the first black edge (step 903). If the first black edge is not found (step 905), the start address is shifted (step 904), and the memory address is moved toward the right to detect the first black edge (step 903). Until the first black edge is detected, the start address is shifted and the detecting operation continues (steps 903, 905, 904). In case the first black edge is not detected for all start addresses (step 901), indicative of the absence of bar code symbol in the memory, another image data is stored in the memory (step 902).

On detecting the first black edge (step 905), tracing takes place around the object along the black edge until the first black edge is detected, with sets of address and data being memorized. From the stored addresses and data, the circumferential length of the black edge and the area of object are evaluated (step 906). If the circumferential length and area are greater than certain values, the object surrounded by the black edge is determined to be a bar code symbol, or otherwise it is negated (step 907). If the object is not a bar code symbol, the sequence returns to step 904, and the start address is shifted to detect another black edge.

Figure 5:
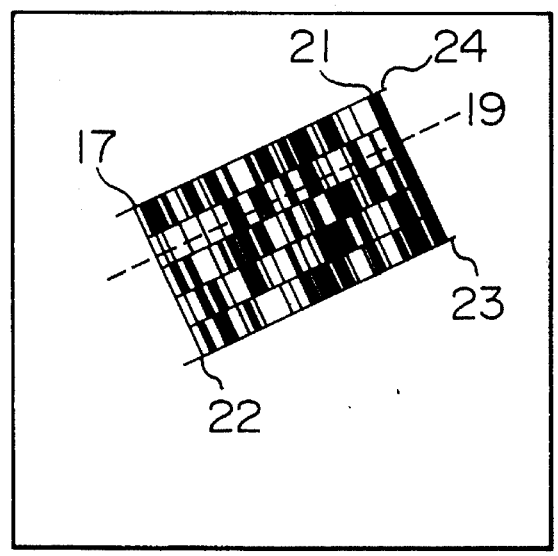
FIG. 5 is a diagram showing, as a pattern figure, the memorized image data following the extraction process.

FIG. 5 shows data of the bar code symbol extracted by the foregoing operation of the extraction means.

Figure 6A:
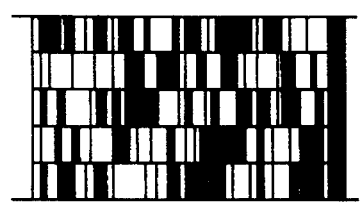
FIG. 6A is a diagram showing an example of two-dimensional bar code symbols based on the Code49 system.
Figure 6B:
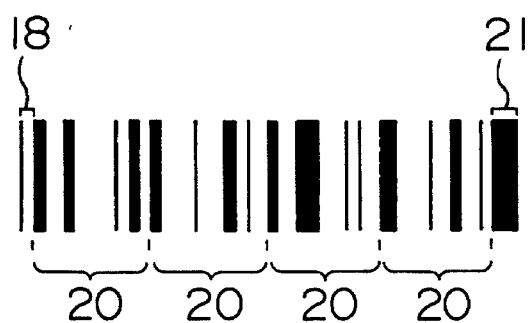
FIG. 6B is a magnified view of part of the bar code symbol shown in FIG. 6A.

FIG. 6A shows an example of bar code symbol of the Code49 system, and FIG. 6B is a magnified view of one stage of the symbol shown in FIG. 6A. Each row of bar code includes a start pattern 18 and a stop pattern 21, indicating the beginning and end of the row. A set of stripes 20 forms a symbolic character, and two code character values are calculated from the value of symbolic character.

Figure 7:
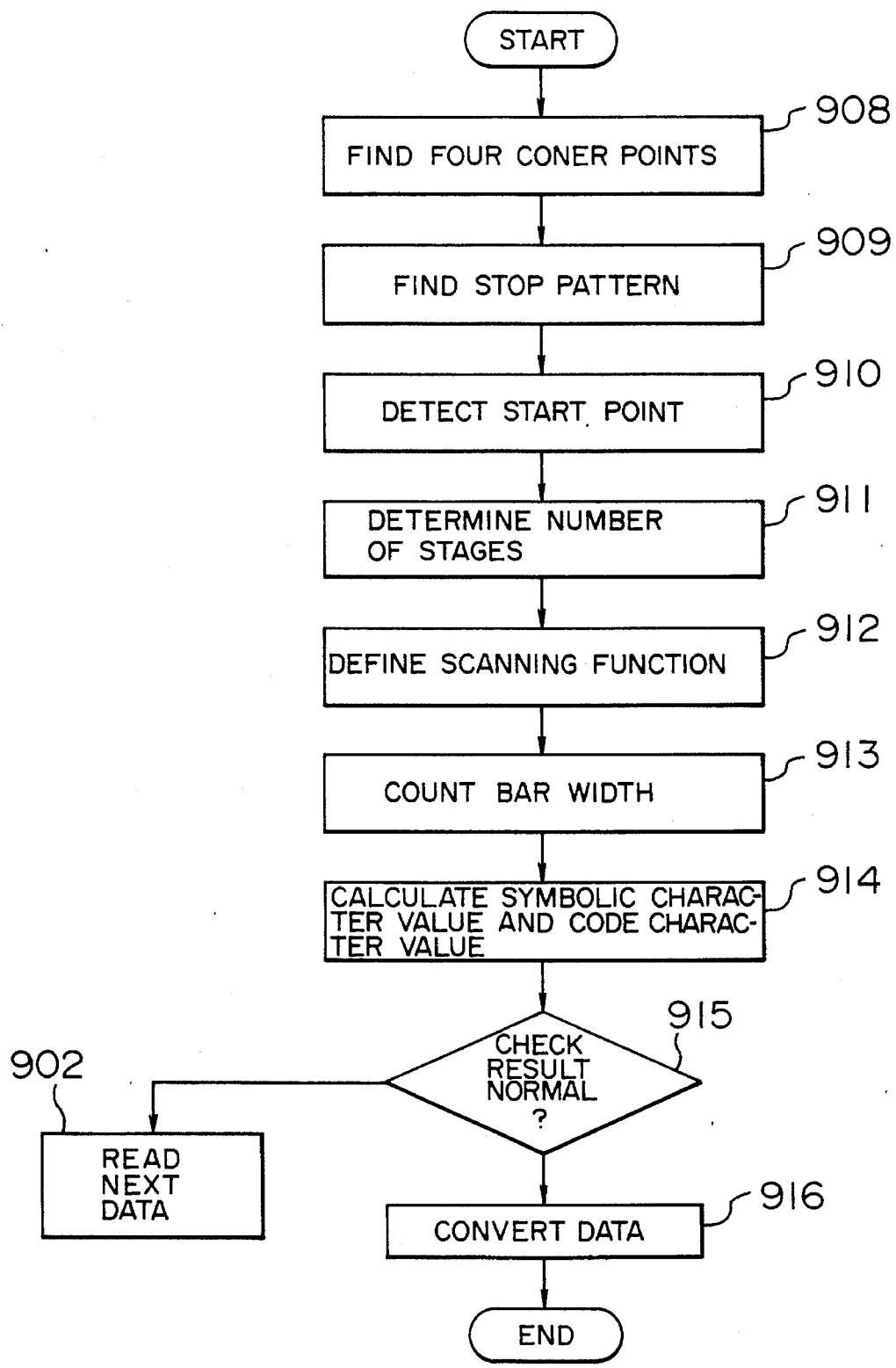
FIG. 7 is a flowchart showing the operation of the decoding means.

FIG. 7 shows in flowchart the operation of the decoding means. The decoding process for the Code49 system will be explained on this flowchart with reference to FIG. 5 and FIGS. 6A and 6B.

Initially, four corner points of the bar code indicated by 17, 22, 23 and 24 in FIG. 5 are detected (step 908). Next, the stop pattern 21 is detected (step 909), and a start point 17 is selected from among the four corner points (step 910).

White bars are traced by starting from the white bar, which is part of the start pattern 18 located on the inner side of the start point 17, along the addresses and data of the black edge memorized in the step 906 of FIG. 4, and the number of stages is counted based on the black line which exists between adjacent stages as shown in FIG. 6A (step 911).

A scanning function is defined to be a shortest line which connects the start pattern 18 and stop pattern 21 of each stage (step 912). The concept of the scanning function is shown by 19 in FIG. 5. The width of bar of each stage is counted in accordance with the scanning function (step 913).

Based on the count value, a code character value is calculated from the symbolic character value 20 which is defined in the Code49 standard, and a checking process for each stage and a checking process for all bar code symbol are implemented (step 914). If the checking processes terminate normally (step 915), the code character value is rendered the data conversion (step 916). If abnormality is detected in the checking processes (step 915), another data is introduced (step 902).

Although the operation for a two-dimensional bar code based on the Code49 system has been explained, one-dimensional bar code symbols and multi-stage bar code symbols can also be treated similarly by the extraction means and decoding means of partly different arrangement.

When the bar-code reader is set to read bar code symbols of only a certain code system, e.g., Code49, the extraction and decoding time can be reduced, or the bar-code reader can be used efficiently by setting it to read bar code symbols of all kinds, i.e., one-dimensional, two-dimensional and multi-stage bar code symbols.

Consequently, even if the bar-code reader is held in an inclined attitude against the bar code label, in which case a complete bar code symbol does not enter at once in the view field of the image sensor, any of one-dimensional, two-dimensional and multi-stage bar code symbols can be read by scanning the bar code symbol with the bar-code reader and storing data of the whole bar code symbol in the memory.

According to this invention, as described above for its specific embodiment, this single bar-code reader is operative to read bar code symbols of various kinds, i.e., one-dimensional, two-dimensional and multi-stage bar code symbols, even if the bar-code reader is held in an inclined attitude against the bar code label, in which case a complete bar code symbol does not enter at once in the view field of the image sensor, through the operation of memorizing the image sensor output produced from the reflected light from the bar code label in synchronism with the scanning operation, extracting a bar code symbol from the memory, and decoding the bar code symbol.

We claim:

1. A bar-code reader comprising:

an image sensor for producing an output signal in response to light incident on said image sensor;

light emission means for projecting a light beam onto a bar code label, said bar code label having a bar code symbol, to effect a scanning across the bar code symbol;

light reception means for focusing a portion of the light beam which is reflected from the bar code label onto said image sensor;

signal processing means for processing the output signal of said image sensor to generate processed data;

memory means for storing said processed data provided by said signal processing means in a serial manner in synchronism with the scanning across the bar code symbol and for storing a two-dimensional array of pixels, having a start address, representing an image of said bar code symbol, said image of said bar code symbol having a plurality of edges including first edge which is closest to said start address;

extraction means for extracting said image of said bar code symbol from said memory means, said extraction means comprising (i) means for reading said two-dimensional array of pixels beginning at said start address to detect said first edge and (ii) means for tracing said edges beginning with said first edge and for detecting corner points of said image which are defined by said edges, whereby a location of said image of said bar code symbol in said two-dimensional array of pixels is determined; and decoding means for decoding the image of the bar code symbol extracted by said extraction means, said decoding means comprising (i) means for detecting a start pattern and a stop pattern in said image, determining a shortest line between said start pattern and said stop pattern, and scanning said image along said shortest line to obtain a first scan result and (ii) stage counting means for determining a number of stages of said bar code symbol, wherein said stage counting means comprises means for scanning said image along a line extending diagonally across said image between two of said corner points to obtain a second scan result, comparing said first scan result to said second scan result and, if said first scan result and said second scan result agree, determining that said bar code symbol is a one-dimensional bar code symbol.

2. A bar-code reader comprising:

an image sensor for producing an output signal in response to light incident on said image sensor;

light emission means for projecting a light beam onto a bar code label, said bar code label having a bar code symbol, to effect a scanning across the bar code symbol;

light reception means for focusing a portion of the light beam which is reflected from the bar code label onto said image sensor;

signal processing means for processing the output signal of said image sensor to generate processed data;

memory means for storing said processed data provided by said signal processing means in a serial manner in synchronism with the scanning across the bar code symbol and for storing a two-dimensional array of pixels, having a start address, representing an image of said bar code symbol, said image of said bar code symbol having a plurality of edges including first edge which is closest to said start address;

extraction means for extracting said image of said bar code symbol from said memory means, said extraction means comprising (i) means for reading said two-dimensional array of pixels beginning at said start address to detect said first edge and (ii) means for tracing said edges beginning with said first edge and for detecting corner points of said image which are defined by said edges, whereby a location of said image of said bar code symbol in said two-dimensional array of pixels is determined; and decoding means for decoding the image of the bar code symbol extracted by said extraction means, said decoding means comprising (i) means for detecting a start pattern and a stop pattern in said image, determining a shortest line between said start pattern and said stop pattern, and scanning said image along said shortest line to obtain a first scan result and (ii) stage counting means for determining a number of stages of said bar code symbol, wherein said stage counting means comprises means for detecting a black line separating adjacent two of said stages and, if said black line is detected, determining that said bar code symbol is a two-dimensional bar code symbol.

* * * * *